March 21, 1961 V. V. PROPST 2,975,649
BALL SCREW ASSEMBLY WITH INTERNAL BALL RETURN
Filed May 18, 1959 2 Sheets-Sheet 1
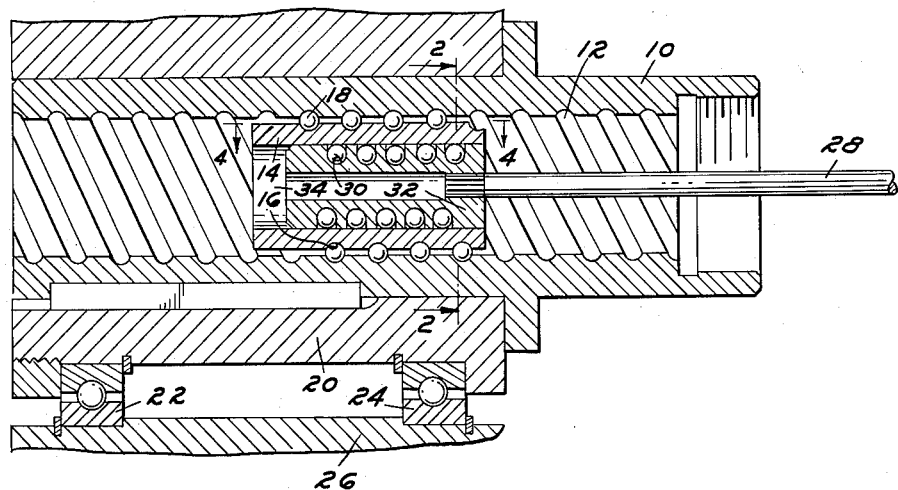
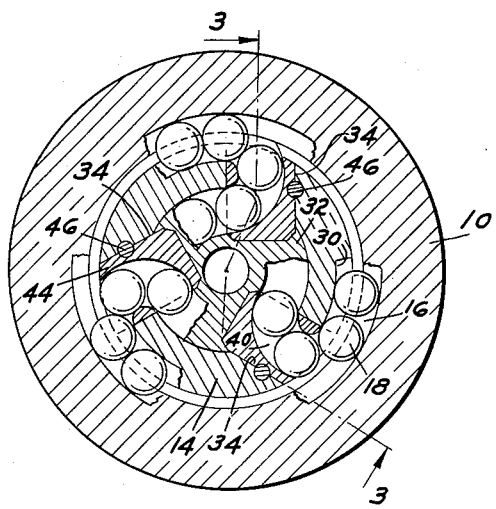
INVENTOR.
VERLE V. PROPST
BY
Barnes, Kisselle, Raisch & Choate
ATTORNEYS March 21, 1961 V. V. PROPST 2,975,649
BALL SCREW ASSEMBLY WITH INTERNAL BALL RETURN
Filed May 18, 1959 2 Sheets-Sheet 2
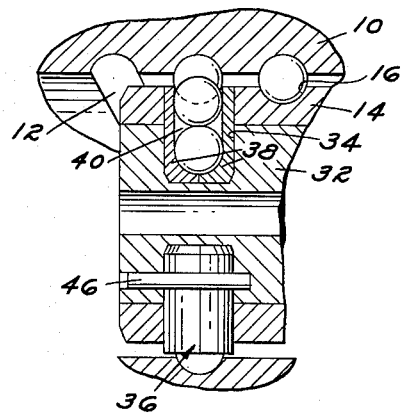
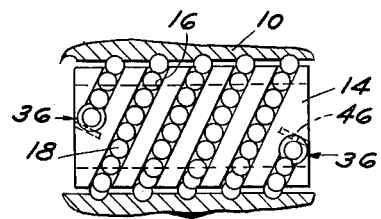
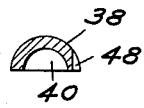
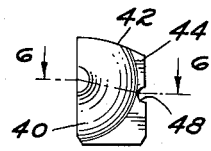
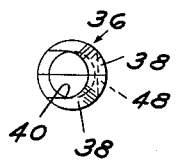
INVENTOR.
VERLE V. PROPST
BY
Barnes, Kisselle, Raisch & Choate
ATTORNEYS

United States Patent Office 2,975,649
Patented Mar. 21, 1961

2,975,649
BALL SCREW ASSEMBLY WITH INTERNAL BALL RETURN

Verle V. Propst, Rochester, Mich., assignor to Beaver Precision Products, Inc., Clawson, Mich., a corporation of Michigan Filed May 18, 1959, Ser. No. 814,032

2 Claims. (Cl. 74—424.8)

This invention relates to a ball screw assembly and more particularly to a ball screw assembly of the type wherein the ball return passageway from one end of the ball groove on the screw to the other end of the ball groove on the screw is arranged internally of the screw.

Ball screws are used in many different applications where it is desired to convert rotary to translatory movement or vice versa with a minimum of friction. In the conventional arrangement, a ball return tube or other means forming a ball return passageway is extended on the nut of the assembly from one end of the ball groove therein to the opposite end thereof. In some applications, it is undesirable or impossible to provide the ball return passageway on the nut; and it therefore becomes necessary to form the ball return passageway internally of the screw. It is to this type of an arrangement that the present invention is specifically directed.

It is an object of this invention to provide a ball screw assembly of the type having an internal ball return passageway which is designed to operate smoothly, which provides a compact arrangement and one which is economical from the standpoint of manufacture.

More specifically, the present invention contemplates a ball screw assembly wherein the ball return passageways are formed as helical grooves within the screw member of the assembly. The deflectors for directing the balls to and from the external helical groove on the screw and the internal helical groove on the screw comprise cylindrically shaped inserts in the screw member fashioned with an arcuate passageway which, when the insert is located in the screw member, connects the external helical groove with the helical internal ball return groove.

In the drawings:

Fig. 1 is an axial sectional view of a ball screw assembly embodying the present invention.

Fig. 2 is a sectional view taken along the line 2—2 in Fig. 1 and showing the arrangement of deflectors at one end of the screw for connecting the external ball grooves with the internal return passageways.

Fig. 3 is a sectional view taken along the line 3—3 in Fig. 2.

Fig. 4 is a sectional view taken along the line 4—4 in Fig. 1.

Fig. 5 is a side elevational view of one half section of a deflector employed in the arrangement of the present invention.

Fig. 6 is a sectional view along the line 6—6 in Fig. 5.

Fig. 7 is a top view of a complete deflector insert.

Referring to Fig. 1, there is illustrated in a general way a ball screw assembly comprising an outer nut member 10 provided with a helical ball groove in the bore thereof and a screw member 14 fashioned with a helical ball groove 16 around the outer periphery thereof. In the arrangement shown, the helical ball grooves 12 and 16 have a triple start. Insofar as the present invention is concerned, a ball groove having a single start could also be employed. In the ball grooves 16 within the axial extent of screw 14, there are arranged bearing balls 18.

For the purpose of illustration, nut 12 is shown keyed to a sleeve 20 rotatably supported as by bearings 22, 24 within an outer body member 26. A rod 28 which, for example, might be associated with a piston-cylinder assembly, is connected with one end of screw member 14. The arrangement is such that when screw member 14 is shifted axially within nut member 10, rotary motion is imparted to the nut 10. This rotary motion of nut 10 results from the travel of balls 18 within the grooves 12, 16. Thus, in the arrangement illustrated in Fig. 1, when screw 14 is shifted to the left, nut 10 is rotated clockwise; and when screw 14 is pulled to the right, nut 10 is rotated counterclockwise. The specific arrangement shown in Fig. 1 is illustrated only as an example of the general arrangement. The invention is not restricted to the specific form of ball screw arrangement shown.

In all ball screw arrangements means are provided for returning the balls to the starting ends of the grooves in the nut or the screw. In the specific arrangement illustrated, the ball return passageway is provided internally of screw 14. The ball return passageways are formed as helical grooves 30 around the periphery of a cylindrical plug 32 fitted within a bore 34 extending axially within screw 14. In the case of a triple start ball groove, the helical ball return passageway 30 would also be formed as a triple start groove, one ball return passageway 30 for each ball groove 16 on nut 14. Ball return passageways 30 are of the same hand to the ball grooves 12, 16; and at opposite end portions of plug 32, each ball return passageway 30 is generally radially aligned with an end portion of a groove 16 on screw 14 (Fig. 2).

Means are provided for connecting the opposite ends of ball return passageways 30 with the radially aligned end portions of the grooves 16 on screw 14. In the arrangement illustrated, these means comprise three cylindrical sockets 34 extending generally radially through screw 14 and into plug 32 adjacent the opposite ends of plug 32. Sockets 34 intersect with the radially aligned end portions of return passageways 30 and ball grooves 16. Within each socket 34, there is arranged a cylindrical insert 36. Each insert 36 may be formed as a one piece casting or as two semi-cylindrical half sections 38. Each half section 38 of insert 36 is fashioned with an arcuate groove 40, which, when the two half sections are assembled and inserted in the sockets 34, provide a return bent passageway connecting the ends of grooves 30 with the radially aligned portions of the grooves 16. The outer end surface 42 of each insert 36 is curved as indicated in Figs. 2 and 5 so as to be flush with the outer cylindrical surface of screw 14. Thus, the trailing edge 44 of each insert projects into its associated groove 16 a sufficient extent to engage the successive balls rolling toward the insert and thereby direct the balls downwardly around passageways 40 and into the ball return passageways 30.

Since the inserts 36 extend through nut 14 and into the plug 32, these inserts prevent relative axial and circumferential movement between plug 32 and nut 14. The inserts are interengaged with screw 14 by means of pins 46 extending axially into the ends of screw 14 through drilled holes which intersect the outer cylindrical surface of inserts 36 as at 48.

In the arrangement illustrated in Fig. 4, the insert 36 at the right end of screw 14 is not associated with the same grooves 16 as the insert 36 at the left end of screw 14. This is true because as pointed out previously, the particular screw shown has a triple start groove. Nevertheless, Fig. 4 illustrates in a general way the course of travel of the balls between the nut and the screw. If the screw 14 is shifted axially to the left, the balls 18 travel a helical path in a direction axially towards the left and are thus directed by the insert 36 at the left radially inwardly to the ball return passageways 30 and by the insert 36 at the right radially outwardly back into the juxtaposed grooves 12, 16 of the nut and screw, respectively. If the screw 14 is shifted axially toward the right, then the direction of movement of balls 18 is reversed. They will be deflected inwardly to the ball return passageways 30 by the insert 36 at the right and outwardly from the ball return passageways into the juxtaposed grooves 12, 16 by the insert 36 at the left.

Thus, it will be seen that I have provided an arrangement for internally recirculating the balls of a ball screw assembly which is not only economical but which is also practical from the standpoint of operation. With the arrangement described, the two ends of the ball groove on the screw need not be axially aligned. Furthermore, the ball recirculating arrangement disclosed does not sacrifice a substantial load bearing area of the screw. In addition, by forming the ball return passageways as helical grooves, the balls are not required to travel as abrupt a turn as would be the case if the ball return passageways were of straight axial form.

I claim:

1. In a helical ball screw assembly, the combination of a nut having an internal helical ball groove, a screw within the nut having an external helical ball groove registering with the helical ball groove on the nut, said screw having an axial bore therethrough, a plug fitted within said bore, means forming a helical ball return passageway at the interengaged cylindrical surfaces of the screw and plug, the ball groove on the screw having portions spaced inwardly from the opposite ends of the screw in radial alignment with portions of the ball return passageway which are located inwardly of the opposite ends of the plug, said screw and plug having coaxial radially extending bores therein spaced inwardly from the opposite ends of the screw and plug and intersecting said radially aligned portions of the ball groove and return passageway, cylindrical inserts fitted within said bores and interengaging the screw and plug against relative rotation and axial movement, said inserts each having a passageway therein communicating at one end with the ball groove on the screw and at the other end with the ball return passageway.

2. The combination called for in claim 1 including pin means extending axially into said plug from opposite ends thereof and interengaging said inserts to retain the inserts in fixed position relative to the plug and screw.

References Cited in the file of this patent

UNITED STATES PATENTS

| | | |
|---|---|---|
| 2,486,055 | Mort et al. | Oct. 25, 1949 |
| 2,851,897 | Cochrane | Sept. 16, 1958 |
| 2,890,594 | Galonska | June 16, 1959 |